Dec. 1, 1953　　　J. H. ANDERSON　　　2,661,147
BLOWER BLADE FASTENING DEVICE
Filed Jan. 19, 1949
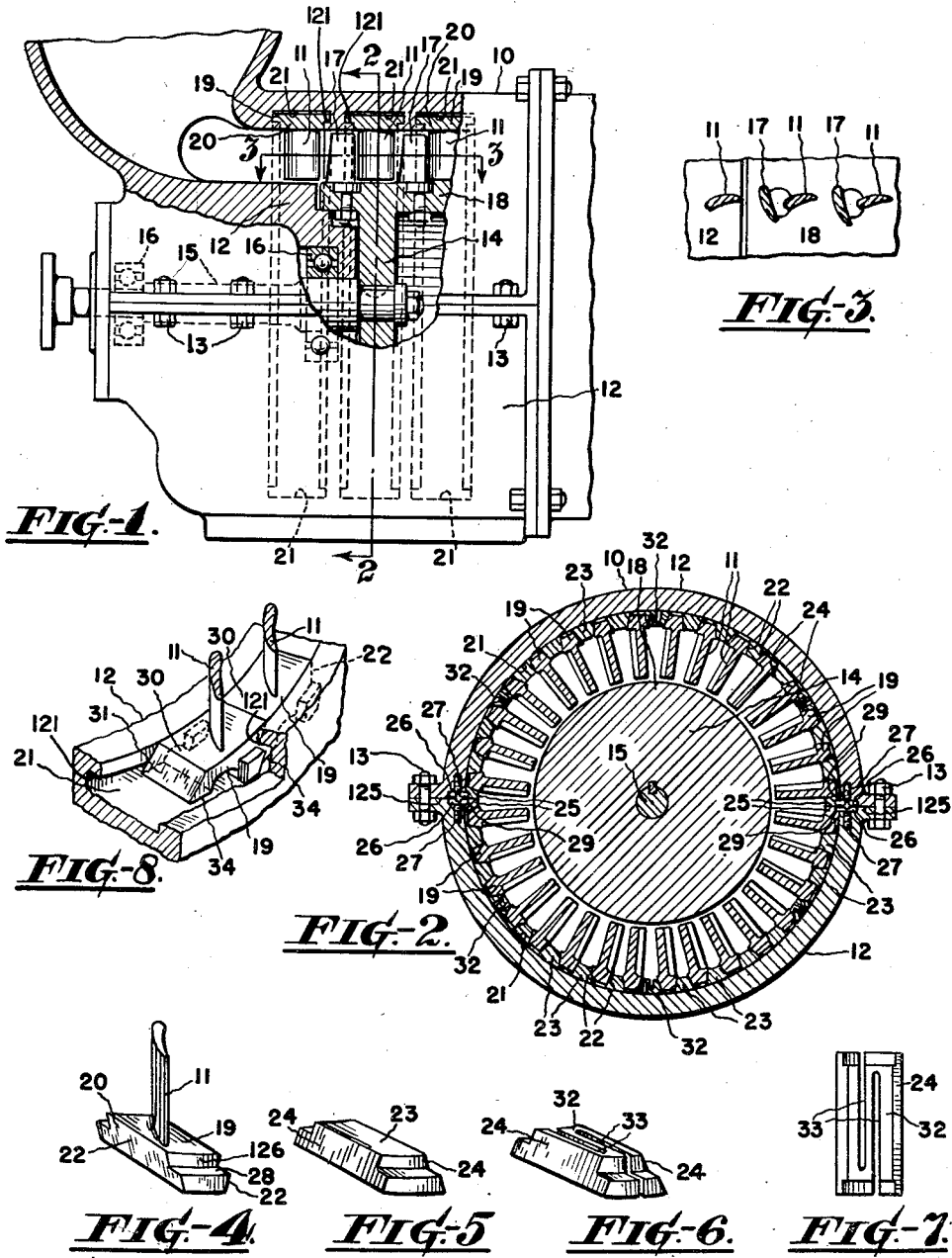
INVENTOR
JAMES H. ANDERSON
BY
HIS ATTORNEY.

Patented Dec. 1, 1953

2,661,147

UNITED STATES PATENT OFFICE 2,661,147

BLOWER BLADE FASTENING DEVICE

James H. Anderson, Easton, Pa., assignor to Ingersoll-Rand Company, New York, N. Y., a corporation of New Jersey Application January 19, 1949, Serial No. 71,659

6 Claims. (Cl. 230—133)

This invention relates to blower blade fastening devices and more particularly to a fastening device for the stationary blades of blowers and the like.

Generally speaking, one of the more frequently used modes of mounting the stationary blades of a blower in its casing consists of forming in the inner periphery of the blower casing, a groove which is in some manner notched so as to retain the blades from dropping or being thrown out of the groove. One disadvantage of this arrangement is that it requires careful machining of the root portion of the blades in order to assure that the blades fit snugly in the groove, that is, if the width of the base or root portion of the blade is less than the depth of the groove in which it is mounted, the blades will vibrate in the groove leading to erratic operation of the blower and to early failure of the blade.

It is, accordingly, one object of my invention to maximize the ease with which the stationary blades of a blower, and the like, may be mounted and to minimize the amount of machining of the root portion of the blades necessary to assure a tight fit thereof in the blower casing.

Other objects of the invention will become obvious from the specification and accompanying drawing in which, Figure 1 is a longitudinal elevation, partly in section, of a blower in which the stationary blades are mounted in accordance to the practice of the invention, Fig. 2 is a transverse view taken through Figure 1 along the line 2—2 looking in the direction of the arrows, Fig. 3 is a transverse view taken through Figure 1 along the line 3—3 looking in the direction of the arrows and shows the relative position of the stationary blades with respect to the rotating blades of the blower, Fig. 4 is a view in perspective of the root portion of the stationary blade, Fig. 5 is a view in perspective of a spacer for the blades, Fig. 6 is a view in perspective of a spring spacer, Fig. 7 is a top view of a spring spacer, and Fig. 8 is a view in perspective of an alternate form of construction for the root portion of the blower blade.

Referring to the drawing, 10 indicates, in general, a machine, which for the sake of example is shown as being a multistage blower, provided with a preferred form of the fastening device for securing the stationary blades 11. The blower 10 comprises, in general, a longitudinally split casing 12 held together by bolts 13 and in which rotates a wheel 14 keyed to a shaft 15 mounted in bearings 16 journaled in the casing 12. Mounted in a conventional manner at equal intervals, with respect to each other, along the rim 18 of the wheel 14 are two parallel rows of blades 17 which extend radially outward from the rim 18 into the space or channels between three parallel rows of stationary blades 11 mounted on the inner periphery of the casing 12. So arranged, the stationary blades 11 serve to direct the flow of fluid to be pumped, into the rotating blades 17 whereby the velocity of such flow is increased, and to receive and direct the flow of such fluid discharged from the rotating blades.

In the preferred form of the invention, the base or root portions, designated in general by 19, of the blades 11 are of a generally T-shaped form— the blade 11 extending radially outward from the stem or leg 20 of the T—to conform with the T-shaped cross section of the grooves 21 formed in the inner periphery of the casing 12 or other member in which the blades may be mounted. In their preferred form, the thickness or depth of the bases, or root portions 19, is substantially less than the depth of the groove 21 thereby eliminating any need to machine the depth of the root portion 19 to the exact depth of the groove 21.

In order to hold the blade 11 securely in the groove 21, the sides 22 of the roots 19 are tapered outwardly or conversely, in the direction toward the base of the root portion, and spacers 23 are inserted between said blades 11. The spacers 23 have the same general shape as the root portion 19 with the exception that the opposite sides 24 of the spacers 23 are tapered in a direction to provide surfaces complementary to and abutting the sides 22. Due to the oppositely tapered form of the spacers 23 with respect to the root portion 19, the blade 11 tends to move inwardly or longitudinally in the direction away from the root 19 whenever there is a force tending to jam the spacer 23 and the root portion 19 together. That is, a force directed along the groove against a spacer 23 is translated into a force, exerted by the spacer 23 against the root portion 19, having longitudinal and transverse components with respect to the root portion 19 or the blade 11. The longitudinal component of force tends to move the root 19 into firm contact with the inner side surfaces 121 of the groove 21; and the transverse component of force tends to move the root 19 into contact with the spacer 23 on the opposite side of the root portion. The latter spacer will, of course, also tend to move the blade longitudinally in the same direction as the first said spacer and transversely in the opposite direction. It is to be understood that the T-shaped groove and root portions are shown by way of illustration only. The form of the root and groove is not critical, it is merely necessary that a side, inside as here shown, of the groove overlie at least a part of the root portion or spacer so that the previously described wedging action may be accomplished.

Each ring of blades 11 is mounted in two semicircular lines or sections, one section in each half of the casing 12. The blades 11 and the spacers 23 are alternately inserted in the open ends of the groove 21 where it terminates in the longitudinal or split edges 125 of the casing 12, and the width of the spacers are such that, for any complete ring, there is one spacer 23 for every blade 11. Thus, the blades 11 and the spacers 23 may be arranged with respect to the split edges 125 so that spacers, designated by 25, overlie the splits in the opposite sides of the casing 12. These two spacers 25 are split transversely and a notch 29 is formed in the base of each spacer to receive the marginal portions of the heads 26 on screws 27 threaded in the opposing edges 125 of the casing 12.

With this arrangement, the screws 27 serve as means to exert oppositely directed forces along the groove and against the spacers and root portions for holding the blades 11 in position—that is, by adjusting this force by tightening either of the screws 27 at the opposite ends of each semi-circular section or line of blades 11, the spacers 23 and 25 are jammed tightly against the root portions 19 and the spacers 23 will move outwardly into contact with the bottom or outer side of the groove 21, and the blades are moved longitudinally inward, in the manner previously described, thereby forcing the lower or inner surface 28 on the arms of the T of the root portions 19 against the material overhanging and forming the inner sides 121 of the groove 21. It is to be noted, further, with this arrangement, that it is not only unnecessary to machine accurately the depth of the root portions 19 but also some tolerance is allowable in the width of the root portions 19 and the spacers 23 in that any slack or looseness between the blades and the spacers, after they are mounted in the groove 21, may be taken up by adjusting the screws 27. The only surfaces that may need machining to properly position the blades are, then, the surfaces 28 and the opposite side surfaces 126 of the leg of the T. These surfaces position the blades 11 with respect to the wheel 14 and the blades 17, respectively.

Thermal expansion and contraction of the root portions or base 19 and the spacers 23 within the groove 21 without materially changing or varying the force exerted on the opposite ends of a line of the blower blades is permitted by the compression or expansion of resilient means such as spring spacers 32 provided in lieu of the spacers 23 at predetermined intervals in each line of blades. In the form of the invention as shown, these spring spacers 32 are similar in construction to spacers 23 with the exception that longitudinal grooves 33, of slightly less length than the length of the spacer, are cut in the spacers 32 from the opposite edges thereof to give the spacers 32 a generally S-shaped form.

In the alternate form of root or base construction, shown in Figure 8, for the blade 11, the need for the spacers 23 and the spring spacers 32 is satisfied by forming an extension 30 on one side of the root portion or base 19 of the blade 11, the outer end of which has an inclined surface 31 abutting the complementary inclined surface, or side, 22 of the adjacent root portion 19. The free end of the extension 30 is turned down or away from the blade 11 to provide a surface 34 which bears against the bottom of the groove 21, thereby holding the intermediate portion of the extension 30 away from the bottom of the groove 21 and leaving it free to flex or bend to maintain a substantially constant force between the bases 19 for holding them securely in the groove 21.

The blades 11 with the modified root or base 19 are mounted and held in position in the manner previously described for the other form of blade mounting with the exception that any tendency to alter the force holding the blades in position, due for example, to the thermal expansion or contraction of the root portion 19, is compensated for by the bending or deformation of the extensions 30. That is, when the blades 11 are initially mounted, the extensions 30 are subjected to a compressive force and, accordingly, bend or give slightly and, therefore, are capable of elongation or further bending in the event of thermal contraction or expansion of the root portions 19. Accordingly, the compression force exerted on the opposite ends of each section of blades by the screws 27 to hold the blade 11 in position, is maintained at a substantially constant value.

It is obvious in the previous discussion that a blade mounting device constructed in accordance with the practice of the invention accomplishes, among others, the objects hereinbefore stated and provides several desirable advantages. As for example, the ease and rapidity with which the blades may be mounted in the blower casing due to the fact that the depth of the root portions of the blades are less than the depth of the groove, as compared to the well known blade construction wherein each blade must be carefully fitted to its mounting.

While I have shown and described specific forms of my invention, it is to be understood that various changes and modifications may be made without departing from the spirit of the invention as set forth in the appended claims.

I claim:

1. In combination with a casing, a peripheral groove in the inner surface of said casing, a rim overhanging said groove, blades having root portions of substantially less depth than the depth of said groove mounted loosely in said groove, inclined surfaces on the opposite sides of said root portions, spacers between said root portions having inclined surfaces complementary to and abutting the first said surfaces for forcing said root portions against said rim, and means mounted on said casing for forcing said spacers against said root portions.

2. In combination with a casing, a peripheral groove in the inner surface of said casing, said groove decreasing in width in the inwardly direction, blades extending radially from said groove, root portions for said blade having a form generally complementary to the cross sectional form of said groove but of substantially less depth than the depth of said groove, inclined surfaces on opposite sides of said portions, means between said blades for maintaining said blades at a predetermined space relation relative to each other, inclined surfaces on said means in face relation with the inclined surface of the adjacent said root portion, and means mounted on said casing for exerting oppositely directed forces along the said groove on said root portions and the first said means to force the first said surfaces against the second said surfaces to move the root portions inwardly into firm relation with a side of said groove.

3. In combination with a casing having a groove therein, blades extending from said groove and having root portions of substantially less depth than the depth of said groove mounted in said groove, said groove having a side overlying said root portions, side surfaces on said root portions inclined with respect to the longitudinal axis of the associated blade, means mounted on said casing extending into said groove to prevent movement of said root portions in one direction along said groove, means on said casing for exerting a force on said root portions in the same direction as the first said direction, and means in said groove having a surface complementary to the side surface of the adjacent root portions for translating the force exerted by the second said means into a force having a component directed along the longitudinal axis of said blade to move said root portion into firm contact with said side of the groove.

4. In combination, a member having a groove therein, blades extending from said groove and having root portions mounted in said groove, said groove having a side overlying at least a part of the root portions, side surfaces on said root portions inclined with respect to the longitudinal axis of the associated blade, a stop mounted on said casing arranged to resist movement of said root portions in one direction along said groove, means on said casing for exerting a force on said root portions in the same direction as the first said direction, and means in said groove having surfaces complementary to the side surface of adjacent root portions for translating the forces exerted by the first said means into a force having a component directed along the longitudinal axes of said blades to move said root portions into firm contact with said side of said groove and at least some of the second said means being resilient so as to maintain such force at a relatively constant value independently of expansion and contraction of said casing.

5. In combination, a casing having a groove in the inner surface thereof, blades having root portions of substantially less depth than the depth of said groove mounted within said groove, said groove having a side overlying said root portions, side surfaces on said root portions inclined with respect to the longitudinal axis of the associated blade and converging toward the base of the root portions, means mounted on the casing at opposite ends of the groove for exerting oppositely directed forces along the groove on said root portions, and means mounted within the groove and between adjacent blades for translating such force into a force having a component directed along the longitudinal axis of said blades for moving the root portions into firm contact with a side of said groove.

6. In combination, a casing, blades having root portions, a groove in the casing for receiving said root portions and having a side overlying at least part of said root portions, surfaces on the opposite sides of said root portions inclined with respect to the longitudinal axis of the associated blade, means mounted on the casing at opposite ends of the groove for exerting oppositely directed forces along the groove on said root portions, spacers mounted in said grooves between some of said blades and having surfaces abutting and complementary to the first said surfaces for exerting a force on said blades in the direction of the longitudinal axis thereof for moving the root portions into firm contact with said side of the groove, and resilient means in said groove between other of said blades and having surfaces abutting and complementary to the first said surfaces for exerting such force and for maintaining said forces exerted on the root portion at a relatively constant value independently of expansion and contraction of the casing.

JAMES H. ANDERSON.

References Cited in the file of this patent

UNITED STATES PATENTS

| Number | Name | Date |
|---|---|---|
| 1,029,489 | Clarke | June 11, 1912 |
| 1,371,327 | Schneider | Mar. 15, 1921 |
| 1,378,464 | Junggren | May 17, 1921 |
| 1,590,328 | Snyder | June 29, 1926 |
| 2,010,022 | Holzwarth | Aug. 6, 1935 |
| 2,013,512 | Birmann | Sept. 3, 1935 |
| 2,406,703 | Morris | Aug. 27, 1946 |
| 2,543,355 | Davis et al. | Feb. 27, 1951 |

FOREIGN PATENTS

| Number | Country | Date |
|---|---|---|
| 10,902 | Great Britain | of 1909 |
| 15,351 | Netherlands | 1926 |
| 27,087 | Great Britain | Dec. 28, 1905 |